United States Patent Office 3,241,804
Patented Mar. 22, 1966

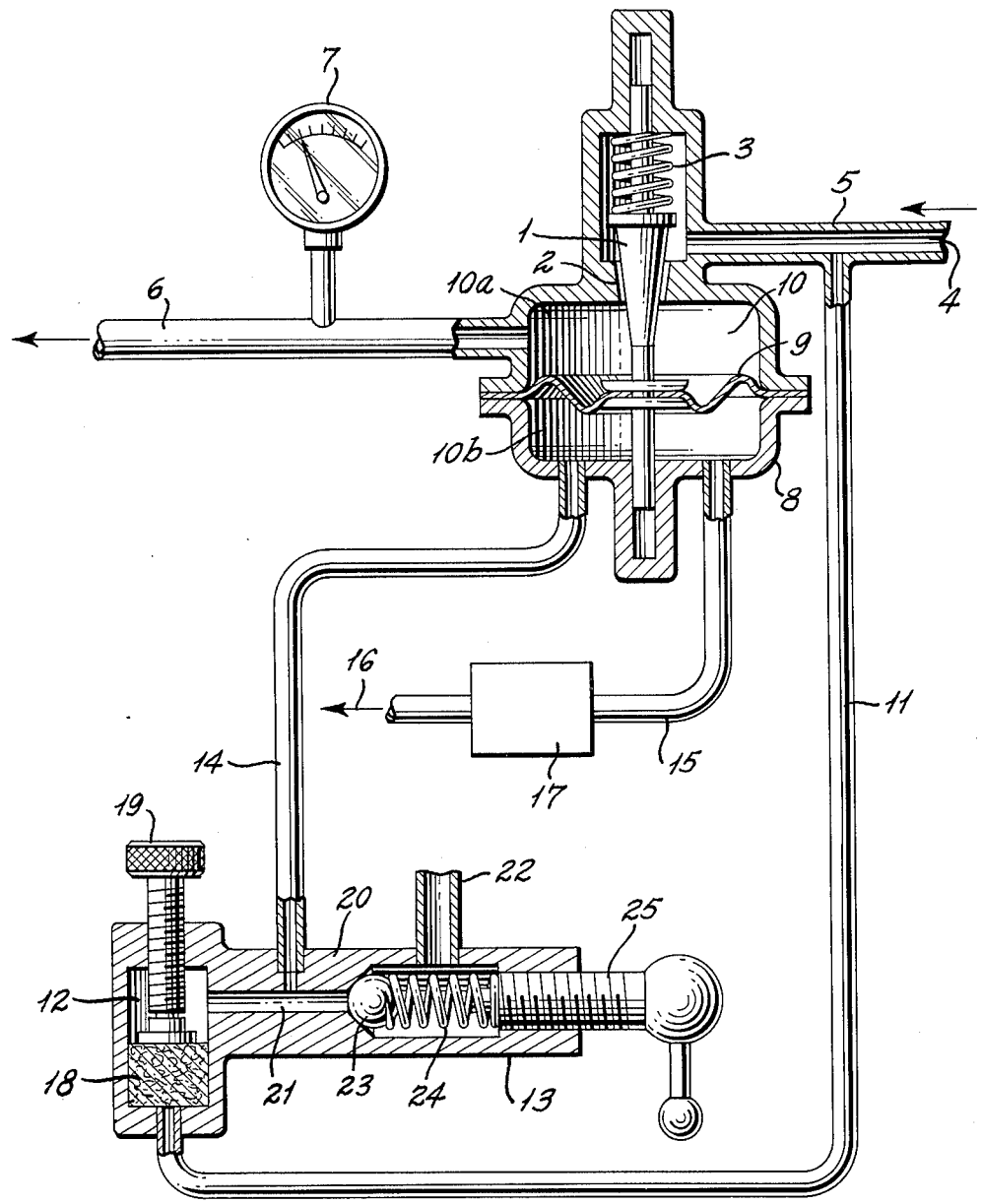

3,241,804
CHOKED PRESSURE TYPE PILOT OPERATED VALVE WITH REMOTE PILOT VALVE ACTUATION
Gustaf Erik Björklund, Stockholm, Sweden, assignor to Rederi Ab Soya, Hagersten, Sweden, a joint-stock company limited of Sweden
Filed Nov. 27, 1962, Ser. No. 240,400
Claims priority, application Sweden, Jan. 31, 1962, 1,076/62
3 Claims. (Cl. 251—41)

The present invention relates to a process in the remote control of executive members in a main pressure medium system.

In pressure medium systems, particularly pneumatic systems, it is often necessary to be able to regulate pressure and air quantity, etc., or to open and shut off the supply of pressure medium in the lines. It is usually necessary to extend an air supply line to the place where control and guiding take place and thereafter to the object which is to be controlled. This is extremely disadvantageous with remote control as lines for full pressure and maximum air quantity must be extended to the place from where control takes place.

One way of avoiding this inconvenience is to use electrically operated valves, but, however, it is often desirable to avoid such means of assistance for several reasons, i.e. from the point of view of personal danger in exposed installations, etc. Furthermore, there is not always a supply of electricity in constructions where, for example, compressed air is used.

The use has previously been suggested in this context of regulators with servo motor means driven by a non-compressible pressure fluid. These regulators presuppose, however, a separate circuit with a special pressure medium source and relatively complicated feeling means for the pressure in the main pressure medium system. The feeling means itself in such systems constitutes a critical point with reference to construction, and furthermore often gives rise to indirect transmission impulses between two systems which are completely separate in relation to each other from the point of view of flow, a source of failures and difficulties.

However, these drawbacks are eliminated by the invention which is principally characterized in that a bleed flow of pressure medium is diverted from the main pressure medium system and subjected to desirable throttling, use being made of the different pressures in the flow in order to adjust the executive members into the desired operating or control positions.

The invention also relates to an arrangement for carrying out the process according to the invention, which is principally characterized by a bleed flow line extending from the main pressure medium system and leading to a source or area with lower pressure than in the system, for instance the atmosphere, and in that one or more operating members for the said executive members working against the pressure in the main pressure medium system are connected in the said line, and that downstream of these operating members a throttle control is arranged, by means of which the pressure in the line can be adjusted so that the operating member or members are caused, depending on the pressure in the line, to adjust the said executive members into the desired operating or control positions.

The invention will be further explained below with reference to an embodiment diagrammatically illustrated in the attached drawing, and in connection with this further characterizing features of the invention will be set forth.

A membrane-guided valve is shown in the drawing, the valve cone 1 of which is arranged to seal against a seat 2. The valve cone 1 is spring-loaded by means of the spring 3. Pressure medium, for instance air, from a pressure source 4 is conducted through a line 5 which, downstream of the valve 1, continues into a line 6 to which later a manometer, designated by the reference numeral 7, is connected.

The reference numeral 8 designates a housing containing an operating arrangement in the form of a membrane 9 which operates in a chamber 10 in the housing 8. The membrane 9 divides the chamber into two parts which are completely separate from each other, designated by 10a and 10b respectively. The working pressure in the main pressure system, which in this case is represented by the pressure source 4, the line 5, the seat 2, the space 10a and the line 6, operates in the space 10a from above towards the membrane 9 and tends to press it down to a bottom position. Because the valve cone 1 rests directly against the membrane 9 and is constantly pressed by the spring 3 to closing position with reference to the seat 2, the valve cone 1 can, in such a depressed position of the membrane 9, seal against the seat 2 and cut off communication between the pressure source 4 and the line 6.

A bleed flow line 11 leads from the line 5 of the main pressure medium system via throttle means 12, which can be regulated, and an adjustable reduction valve 13, through a line 14 into the space 10b of the membrane housing 8, i.e. to the other side of the membrane. From this space 10b, a line 15 in its turn leads out to a source or area with lower pressure than in the main pressure medium system, for instance the atmosphere, the line 15 being provided with a throttle 17 which can be regulated and can be constituted as a foot or hand control or possibly as automatic, possibly programme guided, throttle means.

Returning now to the throttle 12, this can be constituted as an asbestos packing 18 which is compressed by means of a set screw designated by the reference numeral 19, so that an arbitrarily small quantity of pressure medium, for example compressed air, can be withdrawn to flow further through the line 14 to the membrane chamber 10b and out into the free air.

The reduction valve, in accordance with the drawing, consists of a housing 20 with a duct 21 which is normally kept sealed against an outflow conduit 22 by means of a ball 23 which is actuated by a spring 24 the reduction force of which is adjustable by a manually threaded spindle 25. Although this reduction valve is shown connected in the system upstream of the membrane means, i.e. the operating means, there is nothing to prevent it in certain applications from being equally well introduced in the line 15. This reduction valve is introduced if it is desired to limit the working pressure in the regulating conduit. In that case only a very small valve is required compared to when the reduction takes place directly in the working pressure line.

The arrangement described operates in the following manner:

If it is assumed that the throttle 17 is completely open, a bleed flow passes from the main pressure medium system, through the line 11, the throttle 12, the reduction valve 13, the line 14, the space 10b in the membrane chamber 10, the line 15 and the throttle 17 and out into the sub-pressure area 16. This implies that the pressure in the space 10b is less than in the space 10a, whereby the membrane 9 is depressed into its bottom position. Because the valve cone 1, through the agency of the spring 3, constantly presses down against this membrane, the valve cone 1 will also be in its bottom position. This means that the valve cone 1 is completely seated to the walls of the valve seat 2 and cuts off communication between the pressure source 4 and the outgoing line 6.

Meanwhile, however, an arbitrarily small bleed flow passes out from the main pressure medium system to the sub-pressure area 16.

If, from this position, it is desired to effect operation of the main pressure system, the outlet at 17 to the sub-pressure 16 can be throttled by actuating the throttle 17, which can be either a foot control, hand control or possibly programme guided actuating means. Because of this throttling, the pressure in the control or guide system will rise, whereby the membrane 9 is pressed upwards until eventually, when the pressure in both spaces 10a and 10b is the same, it is in an inbetween position, the valve body 1 being pressed up to such a position that communication between the pressure medium source 4 and the conduit 6 is re-established. By different throttling of the throttle means 17 and by reducing the pressure in the guide or control system, the movement of the membrane can be actuated so that adjusted control of the valve cone 1 is obtained.

According to the invention a plurality of similar membrane means can be incorporated at different places in the main pressure medium system.

The arrangement described can be regarded as an example of one application of the invention. There are, however, a great number of possible variations. Thus, the pressure in the operating system can be guided or controlled in an arbitrary manner, as can the working pressure in the main pressure medium system as well. Owing to this, the necessary control effect is extremely small in relation to the effect taken out from the pressure source via the control valve. By connecting several valves in series for control, several courses can be guided simultaneously or with delay by introducing suitably adjusted volumes in combination with variable or fixed throttles. Sequence and delay can thus be adjusted completely arbitrarily. Furthermore, several variable throttles can be introduced in the outgoing line 15 which give a certain total effect. Likewise, several lines 15 can be arranged parallel to each other, each provided with one or more variable throttles in series for effecting an intentional pre-calculated total effect. By using two conduits 15, it is possible for example to obtain a throttling of the valve depending on both throttles in the lines 15 at the respective regulating points being closed so that the valve will function. In this way a simple mutual blocking has thus been introduced. Operation from several places via parallel connected lines 15 can also be carried out by introducing valves in each conduit, the valves closing as soon as any of the parallel coupled conduits 15 are throttled, and thereafter the pressure for actuating the membrane is allowed to rise to the desired value. The invention, as is evident from the stated examples, can be applied in many different ways. As as further example of its execution a case can be mentioned where the valve can be actuated by pressing together the line 15 at an arbitrary point along its length. The line 15 is therewith constituted of soft material, for example rubber or plastic.

It is within the scope of the invention for the membrane 9 to be divided into several membranes with areas for adjustment to other relationship between working pressure and regulating pressure. Moreover, several membranes can be arranged for actuation from separate control circuits to obtain the desired total or separate effects with respect to working pressure or quantity of air.

As is clear from the above, the invention is of extremely general use within control technics. Of course, a medium other than air can also be used. Thus it is conceivable to use the arrangement in hydraulic systems, although there would be the problem of handling a small amount of oil which leaks out through starting line 15. However, it would be simple in this case to arrange a return line, as the conduit 15 requires only a small area in relation to the area of the working pressure line. In using air it is otherwise an advantage that no return lines are necessary.

In the degree that volumes used for control are kept low and the control amount adjusted suitably, control can be performed very speedily. This is essential for obtaining stability in complicated systems.

The opportunities for using the invention can be illustrated by mentioning the control of motors used for dental purposes. Regulation of the number of revolutions of the motor can therewith take place by means of a hand or foot control. The control is formed as a throttle which can be manually varied and can be placed directly on the motor drill unit or, with foot control, suitably placed by the dentist's chair. In the latter case the control can consist merely of plastic tubing on which the dentist can tread and thereby alter the working pressure simply by treading with greater or lesser pressure, which in its turn gives greater or lesser moment to the dental motor. By suitable adjustment of pressure and of separating moment, the number of revolutions can be regulated by the arrangement described.

As has already been mentioned, several courses can be guided with the arrangement described. This is also utilized in the above example for dental purposes, the regulating pressure being able, simultaneously, to control the supply of air to the motor and the mixture of air water which without exception is necessary in dental treatment where modern high-speed dental drills are used. Speed and simultaneous action are obtained without making recourse to electromagnetic valves necessary.

In many cases it is desirable to apply automatic regulation of the number of revolutions in, for example, dental drills. This can be reduced very simply by a closed control chain being arranged where, according to the arrangements described above, according to the invention they are included as one of the intensifying stages in the control chain. The number of revolutions of the dental motor is determined in a suitable manner and converted to an electrical quantity which is compared with a reference quantity in a known manner. The difference is fed into an electronic amplifier which in its turn guides a magnetic valve operating in the control air line. As a very large part of the amplification necessary for the control lies in the pneumatic part of the automatic control, the electronic part can be made simpler and cheaper to a corresponding degree.

Having now described the invention, what I claim as new and desire to secure by Letters Patent, is:

1. Pressure control and regulating valve mechanism connectable in a fluid supply line to deliver fluid at desired variable volumes and pressures and comprising in combination, a valve body having inlet and discharge means, a flexible diaphragm therein dividing the interior of said body into two chambers, a valve seat opening into one of said chambers connecting said fluid inlet with said one chamber, said one chamber forming a flow path between said valve seat and said discharge means, each portion of said one chamber having a greater cross-sectional area than the cross-sectional area of the opening between said discharge means and said one chamber, a valve member operable relative to said valve seat between closed and open positions, biasing means normally urging said valve member into closed engagement with said valve seat, means movable with said diaphragm and interengaging said valve member to move it variable amounts relative to said valve seat correspondingly to vary the flow of fluid therethrough from said inlet to said discharge means, fluid bleed means including conduit means connectable with said fluid supply line and extending to said other chamber of said valve body to deliver line fluid thereto for moving said diaphragm, fluid outlet means leading from said other chamber to an atmosphere, and discharge venting means in said fluid outlet means operable to interrupt the discharge of fluid from said other chamber and thereby move said diaphragm and said valve member by the pressure of line fluid, whereby a predetermined volume of fluid flowing through said valve seat to said fluid discharge means is initiated.

2. A valve system as set forth in claim 1, wherein said fluid bleed means comprises throttle means connected to said conduit means for regulating the amount of fluid bled from said inlet means.

3. A valve system as set forth in claim 2, wherein said throttling means comprises a compressible material located in the path of the bleeding fluid flow and means for selectively compressing said compressible material for varying the amount of fluid flow through said material.

References Cited by the Examiner
UNITED STATES PATENTS

| | | | |
|---|---|---|---|
| 2,309,848 | 2/1943 | King | 251—33 X |
| 2,487,650 | 11/1949 | Grove et al. | 137—139—108 |
| 2,550,410 | 4/1951 | Garrett et al. | 251—33 X |
| 2,586,094 | 2/1952 | Rosenberger | 251—33 X |
| 2,622,610 | 12/1952 | Rowe et al. | 137—100 |
| 2,771,248 | 11/1956 | Ehlke | 251—33 X |
| 2,857,927 | 10/1958 | Pardee | 138—43 X |
| 3,017,897 | 1/1962 | Sequenot | 137—529 |

ISADOR WEIL, *Primary Examiner.*